(12) United States Patent
Choi et al.

(10) Patent No.: US 12,495,640 B2
(45) Date of Patent: Dec. 9, 2025

(54) LIGHT DETECTION DEVICE, SUPERCONDUCTING NANOWIRE SINGLE PHOTON DETECTOR COMPRISING THE SAME AND METHOD FOR MANUFACTURING THE SAME

(71) Applicant: KOREA RESEARCH INSTITUTE OF STANDARDS AND SCIENCE, Daejeon (KR)

(72) Inventors: Jiman Choi, Daejeon (KR); Yonuk Chong, Seoul (KR); Gahyun Choi, Daejeon (KR); Kibog Park, Ulsan (KR)

(73) Assignee: Korea Research Institute of Standards and Science, Daejeon (KR)

( * ) Notice: Subject to any disclaimer, the term of this patent is extended or adjusted under 35 U.S.C. 154(b) by 821 days.

(21) Appl. No.: 17/523,650

(22) Filed: Nov. 10, 2021

(65) Prior Publication Data
US 2022/0238735 A1    Jul. 28, 2022

(30) Foreign Application Priority Data
Nov. 12, 2020   (KR) .......................... 10-2020-0151261

(51) Int. Cl.
*H10F 77/40*        (2025.01)
*B82Y 20/00*        (2011.01)
(Continued)

(52) U.S. Cl.
CPC ........... *H10F 77/413* (2025.01); *H01B 12/04* (2013.01); *H10F 30/21* (2025.01); *H10F 71/00* (2025.01); *B82Y 20/00* (2013.01)

(58) Field of Classification Search
CPC ... H01J 37/3174–3177; H01L 21/0276; H01L 27/14625–14629; H01L 27/1463; H01L 21/027
See application file for complete search history.

(56) References Cited

U.S. PATENT DOCUMENTS 5,569,355 A * 10/1996 Then .................. H01J 9/125
216/33
6,861,177 B2 * 3/2005 Pinarbasi .............. B82Y 10/00
430/296
(Continued)

FOREIGN PATENT DOCUMENTS

IN      103852821 A     6/2014
JP      11-084181 A     3/1999
(Continued)

*Primary Examiner* — Chad M Dicke
*Assistant Examiner* — Mario Andres Autore, Jr.
(74) *Attorney, Agent, or Firm* — Dickinson Wright PLLC

(57) ABSTRACT

A light detection device having improved self-alignment precision using a hard mask, and a method for manufacturing the same is provided. A method of manufacturing a light detection device includes i) providing a substrate; ii) providing a light reflecting portion on the substrate; iii) providing a light detection portion on the light reflection portion; iv) providing an anti-reflection portion provided on the light reflection portion to cover the light detection portion; v) removing each of the first outer periphery of the light reflection portion and the second outer periphery of the anti-reflection portion, and vi) providing a hard mask formed to correspond to the removed first outer periphery, positioned on the substrate, and spaced apart from the light reflecting portion to surround the light reflecting portion.

5 Claims, 14 Drawing Sheets

(51) Int. Cl.
*H01B 12/04* (2006.01)
*H10F 30/21* (2025.01)
*H10F 71/00* (2025.01)

(56) References Cited

U.S. PATENT DOCUMENTS

| | | | | |
|---|---|---|---|---|
| 2002/0164884 | A1* | 11/2002 | Lishan | H10D 30/061 |
| | | | | 257/280 |
| 2004/0042729 | A1* | 3/2004 | Zhou | G02B 6/136 |
| | | | | 385/49 |
| 2005/0230706 | A1* | 10/2005 | Yagyu | H10F 30/225 |
| | | | | 257/481 |
| 2008/0191240 | A1* | 8/2008 | Yagyu | H10F 77/14 |
| | | | | 257/E31.064 |
| 2009/0160000 | A1* | 6/2009 | Kim | H10F 39/8063 |
| | | | | 257/E31.127 |
| 2013/0256259 | A1* | 10/2013 | Chang | B81C 1/00349 |
| | | | | 427/539 |
| 2014/0167107 | A1* | 6/2014 | Yoneda | H10F 77/1248 |
| | | | | 257/184 |
| 2015/0076322 | A1* | 3/2015 | Pang | H10F 39/8023 |
| | | | | 250/208.1 |
| 2015/0249197 | A1* | 9/2015 | Shieh | H10H 20/857 |
| | | | | 438/34 |
| 2022/0120868 | A1* | 4/2022 | Takatsuka | H10F 77/413 |
| 2023/0135677 | A1* | 5/2023 | Oh | H01L 21/0337 |
| | | | | 438/671 |
| 2023/0187462 | A1* | 6/2023 | Tsukada | H10F 39/8067 |
| | | | | 257/432 |

FOREIGN PATENT DOCUMENTS

| | | |
|---|---|---|
| JP | 2001345436 A | 12/2001 |
| JP | 2001358359 A | 12/2001 |
| JP | 2005250003 A | 9/2005 |
| JP | 2008235756 A | 10/2008 |
| JP | 2011033368 A | 2/2011 |
| KR | 970005150 B1 | 4/1997 |
| KR | 20040050503 A | 6/2004 |

* cited by examiner

Before Assembling → After Assembling

LIGHT DETECTION DEVICE, SUPERCONDUCTING NANOWIRE SINGLE PHOTON DETECTOR COMPRISING THE SAME AND METHOD FOR MANUFACTURING THE SAME

RELATED APPLICATIONS

This application claims priority to and the benefit of Korean Patent Application No. 10-2020-0151261, filed in the Korean Intellectual Property Office on Nov. 12, 2020, the entire amounts of which are incorporated herein by reference.

FIELD

The present disclosure relates to a light detection device, superconducting nanowire single photon detector (SNSPD) including the same and a method for manufacturing the same. More particularly, it relates to a light detection device having improved self-alignment precision using a hard mask, superconducting nanowire single photon detector including the same and a method for manufacturing the same.

BACKGROUND

The single photon detector detects individual light particles even in very weak light. Among various single photon detectors, an SNSPD has advantages such as high efficiency, low dark count rate (DCR), and low jitter. Therefore, the utilization of SNSPD is increasing in the field of quantum information communication and quantum optics.

Among various SNSPDs, the SNSPD combined with optical fiber is the most used due to its low optical loss and high utilization. When combining SNSPD and optical fiber, it is necessary to precisely align the optical fiber core with a size of several micrometers and the detection area of the detector.

The above information disclosed in this Background section is only for enhancement of understanding of the background of the disclosure, and therefore, it may contain information that does not form the prior art that is already known in this country to a person of ordinary skill in the art.

BRIEF SUMMARY

A light detection device with improved self-alignment precision by using a hard mask is provided. Also, superconducting nanowire single photon detector including the light detection device is provided. A method for manufacturing such a light detection device is provided.

A method of manufacturing a light detection device according to an embodiment of the present disclosure includes i) providing a substrate; ii) providing a light reflecting portion on the substrate; iii) providing a light detection portion on the light reflection portion; iv) providing an anti-reflection portion provided on the light reflection portion to cover the light detection portion; v) removing each of the first outer periphery of the light reflection portion and the second outer periphery of the anti-reflection portion, and vi) providing a hard mask formed to correspond to the removed first outer periphery, positioned on the substrate, and spaced apart from the light reflecting portion to surround the light reflecting portion.

The providing the hard mask may include i) providing an electron beam resistance layer covering a portion except for a predetermined region formed to be spaced apart from an edge of the light reflection portion and a surface of the substrate and exposing a substrate corresponding to the predetermined region; ii) depositing a mask layer covering the predetermined region and the electron beam resistance layer; iii) removing the electron beam resistance layer and the mask layer formed on the electron beam resistance layer to provide a remaining mask layer in the predetermined region; iv) forming a photoresist layer partially covering the remaining mask layer while aligning with the remaining mask layer and exposing a third outer periphery of the remaining mask layer to the outside; v) removing a portion of the substrate exposed to the outside of the third outer periphery; and vi) removing the photoresist layer to provide the hard mask. An upper portion of the third outer periphery may be etched and then a height of the third outer periphery is smaller than an average height of the remaining mask layer in the removing a portion of the substrate exposed to the outside of the third outer periphery.

In the providing the substrate, the substrate may include i) a circular part and ii) a holder part connected to one side of the circular part and is longitudinally extended. The hard mask may be provided on an outer periphery of the circular part in the providing the hard mask. The removing each of the first outer periphery of the light reflection portion and the second outer periphery of the anti-reflection portion may include i) forming a photoresist layer on the anti-reflection portion; ii) removing each of the first outer periphery and the second outer periphery by wet etching, and iii) removing the photoresist layer. A shared area of the anti-reflection portion and the photoresist layer may be surrounded by a non-shared area of the anti-reflection portion and the photoresist layer, and the first outer periphery and the second outer periphery are positioned in the non-shared area.

A light reflection device according to an embodiment of the present disclosure includes i) a light reflecting portion positioned on the substrate; ii) a light detection portion positioned on the light reflection portion; iii) an anti-reflection portion positioned on the light reflection portion and covering the light detection portion; and iv) a hard mask positioned on the substrate and spaced apart from the light reflection portion to surround the light reflection portion.

The substrate may include i) a circular part and ii) a holder part connected to one side of the circular part and is longitudinally extended. The hard mask may be located on an outer periphery of the circular part. The width of the hard mask may be 10 µm to 20 µm.

The hard mask may include i) an inner surface portion that is spaced apart from the light reflection portion and surrounds the light reflection portion while opposing to the light reflection portion, and ii) an outer peripheral portion surrounding the outer side of the inner surface portion in contact with the inner surface portion. A height of the inner surface portion is greater than a height of the outer peripheral portion. The hard mask may include at least one metals selected from the group consisting of chromium, aluminum, or silicon oxide.

A distance between the hard mask and the light reflection portion may be 10 µm to 1000 µm. The side surface of the substrate and the side surface of the hard mask may be aligned with each other and vertically connected in series.

A superconducting nanowire single photon detector according to an embodiment of the present disclosure includes i) a holder; ii) a sleeve that is adapted to be inserted into the holder and is adapted to receive and guide an optical ferrule; and iii) a light detection device that is adapted to be inserted below the sleeve and is coupled to be inserted together with the optical ferrule. The light detection device includes i) a light reflecting portion positioned on the substrate; ii) a light detection portion positioned on the light reflection portion; iii) an anti-reflection portion positioned on the light reflection portion and covering the light detection portion; and iv) a hard mask positioned on the substrate and spaced apart from the light reflection portion to surround the light reflection portion.

The substrate may include i) a circular part and ii) a holder part connected to one side of the circular part and is longitudinally extended. The hard mask may be located on an outer periphery of the circular part. The hard mask may include i) an inner surface portion that is spaced apart from the light reflection portion and surrounds the light reflection portion while opposing to the light reflection portion, and ii) an outer peripheral portion surrounding the outer side of the inner surface portion in contact with the inner surface portion. The height of the inner surface portion may be greater than a height of the outer peripheral portion. The side surface of the substrate and the side surface of the hard mask may be aligned with each other and vertically connected in series.

The self-alignment precision of the light detection device can be improved by using a hard mask. As a result, it is possible to increase the coupling efficiency between the optical fiber and the detector, which occupies a large proportion in the detector efficiency. In addition, it can be combined with an optical fiber by minimizing the loss rate.

DETAILED DESCRIPTION

Figure 1:
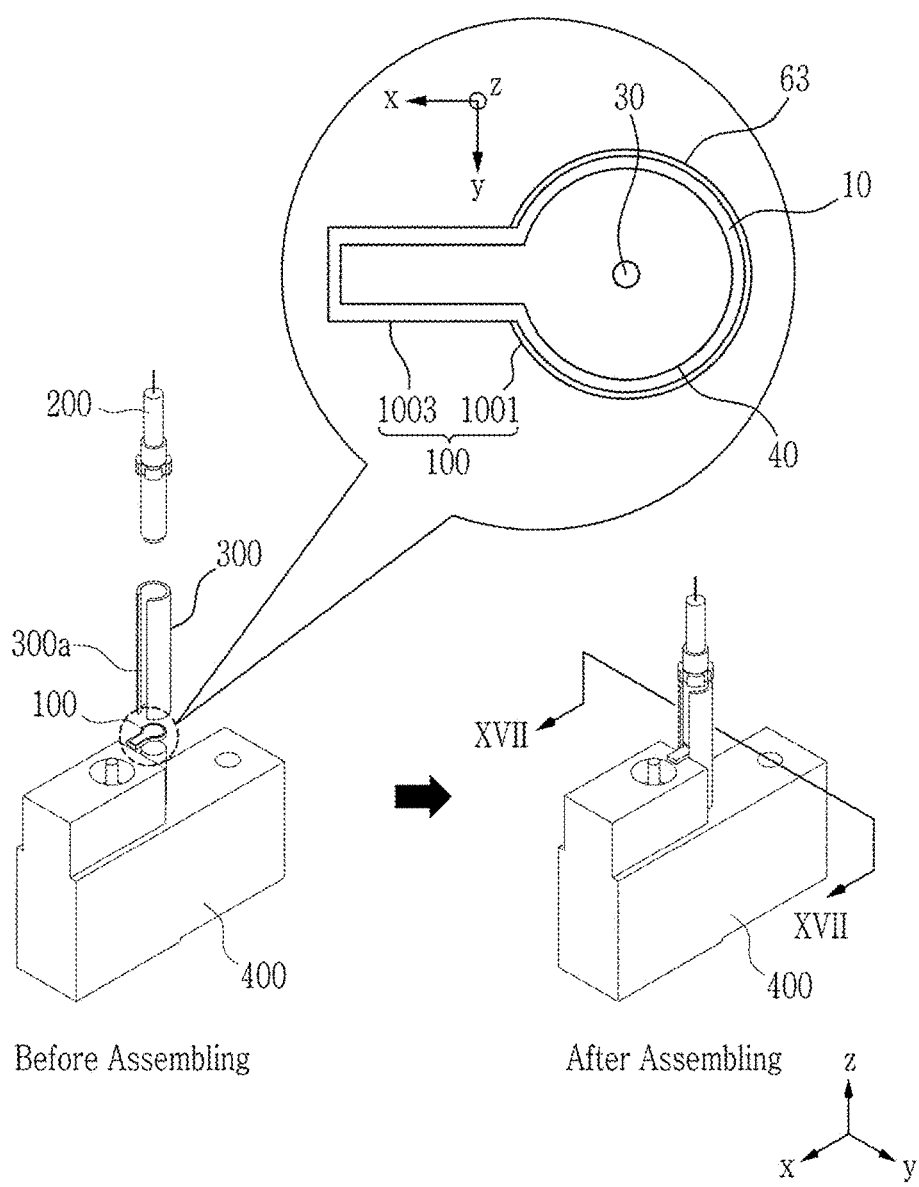
FIG. 1 is a schematic perspective view of an SNSPD according to an embodiment of the present disclosure.

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure. Advantages and characteristics of the technical disclosure and methods for achieving them should become apparent with reference to exemplary embodiments described in detail below in addition to the accompanying drawings. However, the scope of the disclosure is not limited to the exemplary embodiments which will be described below, and may be implemented in various forms. Throughout the specification, like elements refer to like reference numerals. Detailed description of the well-known prior art is omitted.

It will be understood that, although the terms first, second, etc., may be used herein to describe various elements, these elements should not be limited by these terms. These terms are only used to distinguish one element from another. As used herein, the singular forms "a", "an", and "the" are intended to include the plural forms as well, unless the context clearly indicates otherwise. In addition, when a unit "comprises" an element, the unit does not exclude another element but may further include another element unless the context clearly indicates otherwise.

Hereinafter, embodiments of the present disclosure will be described in detail with reference to the accompanying drawings so that those skilled in the art can easily carry out the present disclosure. The present disclosure may, however, be embodied in many different forms and should not be construed as limited to the embodiments set forth herein.

FIG. 1 schematically shows an SNSPD including a light detection device 100 according to an embodiment of the present disclosure. More specifically, FIG. 1 shows a state before and after assembling of the light detection device 100 in the SNSPD. An enlarged circle of FIG. 1 shows a schematic plan view of the light detection device 100. The SNSPD and the light detection device 100 shown in FIG. 1 is merely for illustrating the present disclosure, and the present disclosure is not limited thereto. Accordingly, the SNSPD and light detection device 100 of FIG. 1 may be modified into other forms.

As shown in the state before assembling on the left side of FIG. 1, the light detection device 100 is coupled and inserted together with the optical ferrule 200 and the sleeve 300 in the holder 400. The light detector 100 is guided to be inserted below the sleeve 300 and the light ferrule 200 is guided to be inserted above the sleeve 300. Accordingly, the light detection device 100 and the optical ferrule 200 are aligned with each other by the sleeve 300 and contact each other.

As shown in the state after assembling on the right side of FIG. 1, the sleeve 300 is inserted and fixed in the holder 400. Accordingly, the light detection device 100 and the optical ferrule 200 may be stably aligned. For this, the light detection device 100 needs to be inserted into the sleeve 300 without tolerance. In particular, since the size of the light detection device 100 is very small, precise control is required.

The enlarged circle of FIG. 1 schematically shows an enlarged planar structure of the light detection device 100. That is, the magnified circle of FIG. 1 indicates a state in which the light detection device 100 is viewed from the XY plane direction. As shown in the enlarged circle of FIG. 1, the light detection device 100 includes a circular part 1001 and a holder part 1003. The holder part 1003 is connected to one side, that is, the left side of the circular part 1001 and is longitudinally extended in the x-axis direction. The holder part 1003 is inserted into the holder 400 to stably fix the light detection device 100 to the holder 400.

Meanwhile, the light detection device 100 includes a substrate 10, a light detection device 30, an anti-reflection portion 40, and a hard mask 62. In addition, the light detection device 100 may further include other components as needed. Here, since the hard mask 62 is formed at a predetermined height, the sleeve 300 may be stably guided along the outer periphery thereof. On the other hand, the holder part 1003 is inserted into the groove part 300*a* opened to one side of the sleeve 300. Accordingly, the holder part 1003 is inserted into the groove part 300a and is fixed while moving stably in the z-axis direction. As a result, the light detection device 100 can be stably inserted and fixed in the sleeve 300.

Here, since the hard mask 62 is guided in the sleeve 300, it is provided only on the outer periphery of the circular part 1001. The hard mask 62 cannot be formed at the connection part between the circular part 1001 and the holder part 1003, and the holder part 1003 is located outside the sleeve 300, so that the hard mask 62 is unnecessary. Therefore, the hard mask 62 is formed only on the outer periphery of the circular part 1001 except for the connection part with the holder part 1003 of the circular part 1001. Hereinafter, a method of manufacturing the light detection device 100 will be described in more detail with reference to FIGS. 2 to 14.

Figure 2:
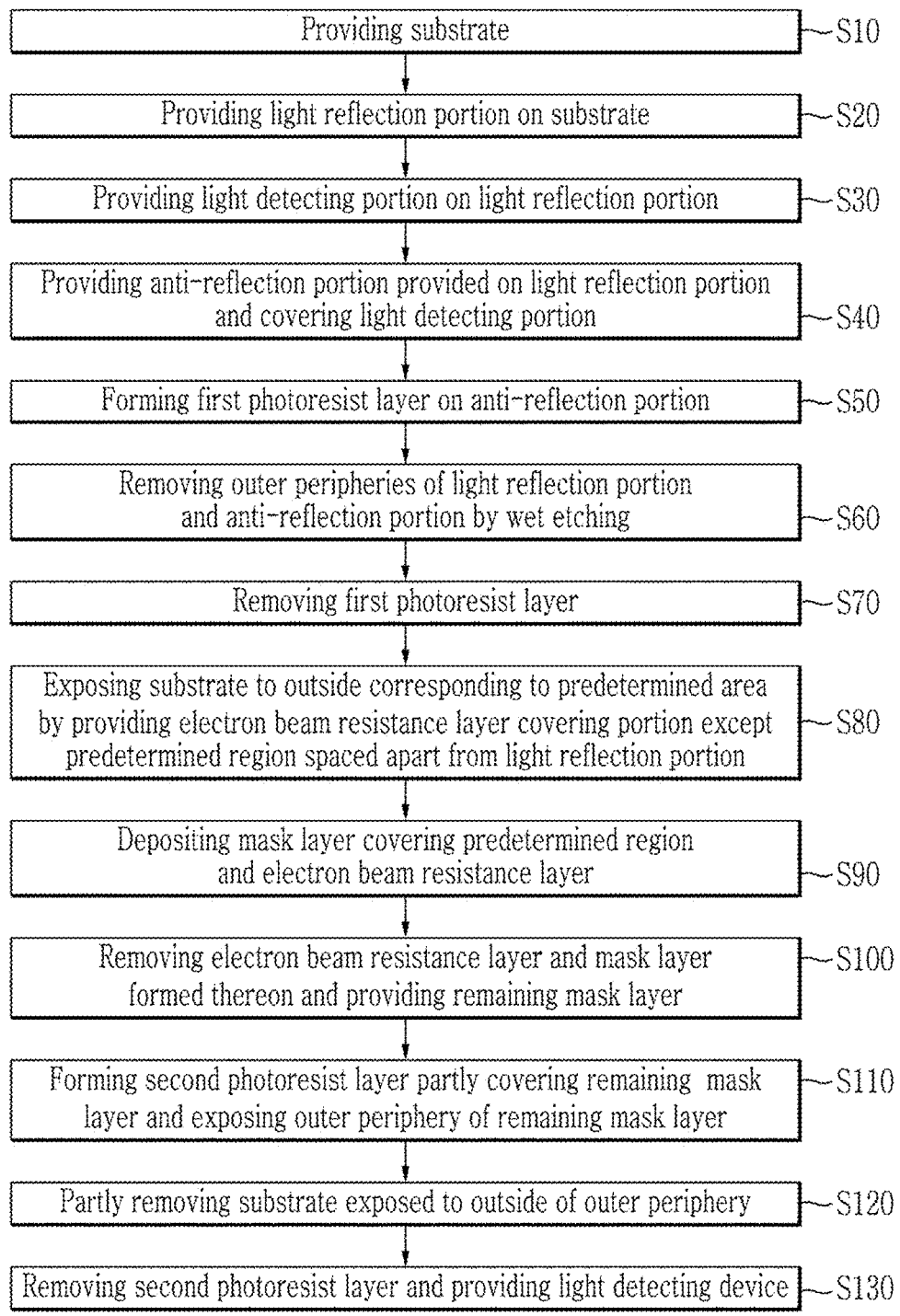
FIG. 2 is a schematic flowchart of a method of manufacturing a light detection device according to an embodiment of the present disclosure.

FIG. 2 is a schematic flowchart of a method of manufacturing the light detection device 100 according to an embodiment of the present disclosure. The manufacturing method of the light detection device 100 of FIG. 2 is merely to illustrate the present disclosure, and the present disclosure is not limited thereto. Accordingly, a method of manufacturing the light detection device 100 may be differently modified.

Meanwhile, FIGS. 3 to 15 schematically show a cross-sectional structure of the light detection device 100 in each step of the flowchart of FIG. 2. Hereinafter, a method of manufacturing the light detection device 100 will be described in detail with reference to FIGS. 3 to 15 with reference to FIG. 2.

The manufacturing method of the light detection device 100 of FIG. 2 includes providing a substrate S10, providing a light reflecting portion on the substrate S20, providing a light detecting unit on the light reflecting portion S30, providing an anti-reflection portion provided on the light reflection portion to cover the light detection portion S40, forming a first photoresist layer on the reflection prevention portion S50, wet etching the first outer periphery of the light reflection portion and removing the second outer periphery of the anti-reflection portion S60, removing the first photoresist layer S70, providing an electron beam resistance layer covering the remaining portion except for the predetermined area spaced apart from the light reflection portion exposing the substrate corresponding to the predetermined region to the outside S80, depositing a mask layer covering the predetermined region and the electron beam resistance layer S90, removing the electron beam resistance layer and the mask layer formed thereon S100, forming a second photoresist layer partially covering the mask layer and exposing the outer periphery of the mask layer to the outside S110, removing a portion of the substrate exposed to the outside of the outer periphery S120, and removing the second photoresist layer S130. In addition, the method of manufacturing the light detection device 100 may further include other steps.

Figure 3:
FIGS. 3 to 15 are schematic cross-sectional views showing each step of the method of manufacturing the light detection device of FIG. 2.

First, in S10 of FIG. 2, the substrate 10 is provided as shown in FIG. 3. As a material of the substrate 10, silicon can be used. Accordingly, a plurality of light detection devices 100 can be formed together by increasing the area of the substrate 10. That is, since the size of the light detection device 100 is approximately 2.5 mm×5 mm, approximately 3000 light detection devices 100 can be manufactured in the case of an 8-inch wafer. In addition, the substrate 10 can be manufactured at low cost by using the substrate 10 made of a commercially available material.

Figure 4:
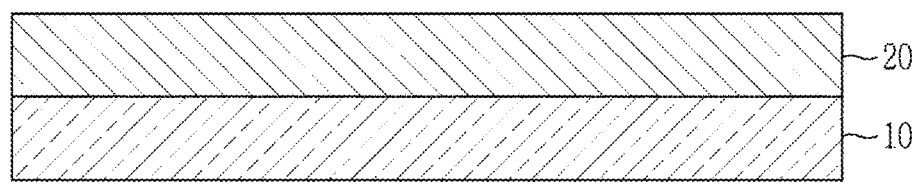

Next, in S20 of FIG. 2, an optical cavity 20 is provided on the substrate 10 as shown in FIG. 4. The light reflection portion 20 resonates light therein. As a result, the light incident to the light reflection portion 20 is amplified while resonating, thereby helping the light detection portion 30 to detect the light well. The light reflection portion 20 is formed on the substrate 10 through a method such as deposition. The light reflection portion 20 includes dielectrics for resonance. A diffuse Bragg reflector using a dielectric may be used as the light reflecting portion 20. The dispersed Bragg reflector is formed into a multi-layer structure of several μm by alternately depositing two dielectric thin films with different refractive indices of several hundred nm thick. On the other hand, a metal reflection mirror may be used as the light reflection portion 20. The metal reflection mirror is formed by coating a dielectric material and a metal having excellent reflectance.

Figure 5:
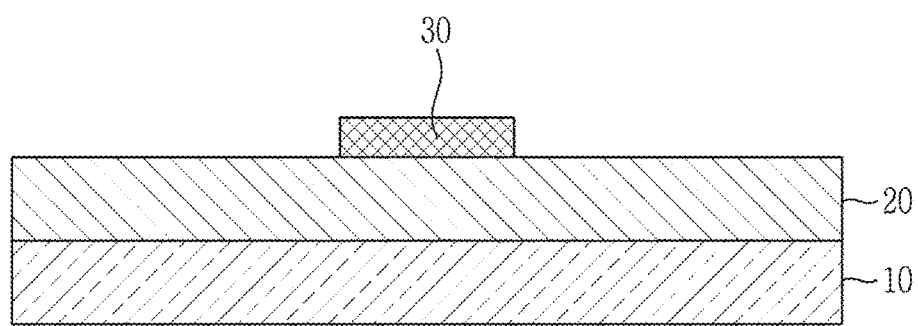

In S30 of FIG. 2, the light detection portion 30 is provided on the light reflection portion 20 as shown in FIG. 5. When a photon incident through the optical module through the light detection device 30 is absorbed, an electrical signal is generated. In SNSPD, NbN, NbTiN, WxSi1-x, MoxSi1-x, etc. may be used as a material of the light detection device 30. The light detection device 30 is located at the center of the light detection device. That is, it is located in the center of the circular part of the light detection device and efficiently absorbs photons emitted from the corresponding optical fiber.

Figure 6:
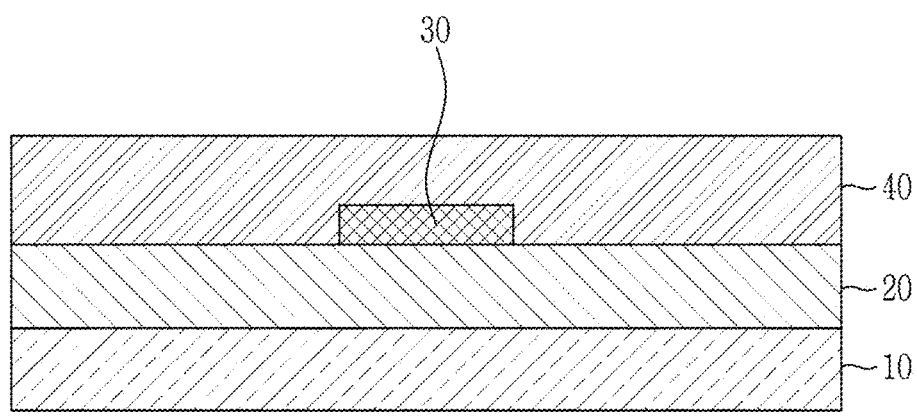

As shown in FIG. 2, in S40, the anti-reflection portion 40 covering the light detection portion 30 is provided as shown in FIG. 6. An anti-reflection portion 40 is provided above the light reflection portion 20. The anti-reflection portion 40 may be manufactured through deposition in a vacuum chamber. In addition, it may be formed of titanium oxide or silicon oxide by using a sol-gel through spin coating. The anti-reflection portion 40 increases light transmittance so that light emitted from the optical fiber is easily incident on the light detection portion 30.

Figure 7:
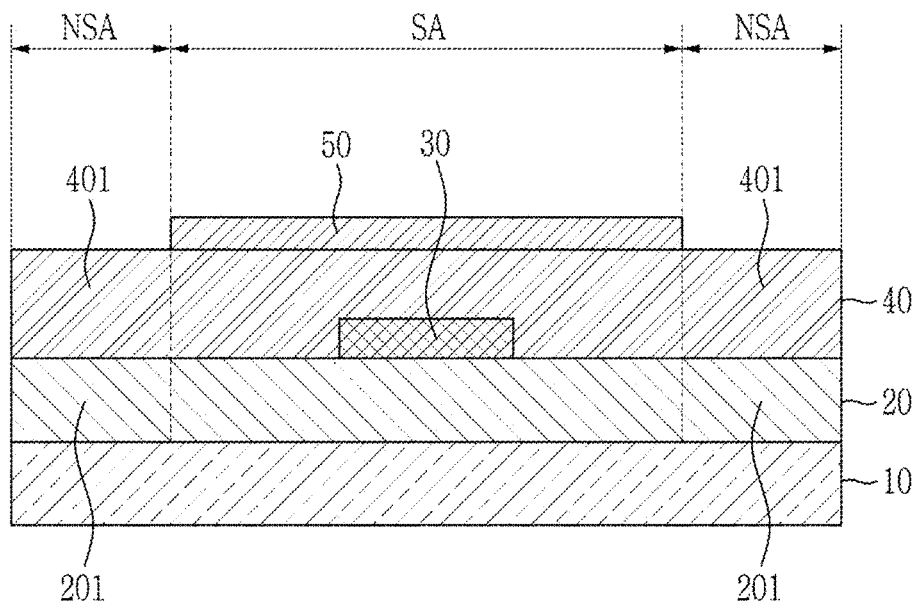

In S50 of FIG. 2, the first photoresist layer 50 is formed on the anti-reflection portion 40, as shown in FIG. 7. Although not shown in FIG. 6, the first photoresist layer 50 is applied on the anti-reflection portion 40 to have a smaller area than the anti-reflection portion 40 using a mask. As a result, the shared area SA and the non-shared area NSA surrounding the shared area SA are formed. The shared area SA refers to an area in which the first photoresist layer 50, the anti-reflection portion 40, and the light reflection portion 20 overlap each other, and the non-shared area while the non-shared area NSA refers to a region in which the photoresist layer 50 is not present and only the anti-reflection portion 40 and the light reflection portion 20 are present. The outer periphery 401 of the anti-reflection portion 40 on which the first photoresist layer 50 is not formed and the outer periphery 201 of the light reflection portion 20 are exposed to the outside. The outer peripheries 201 and 401 are located in the non-shared area NSA.

Figure 8:
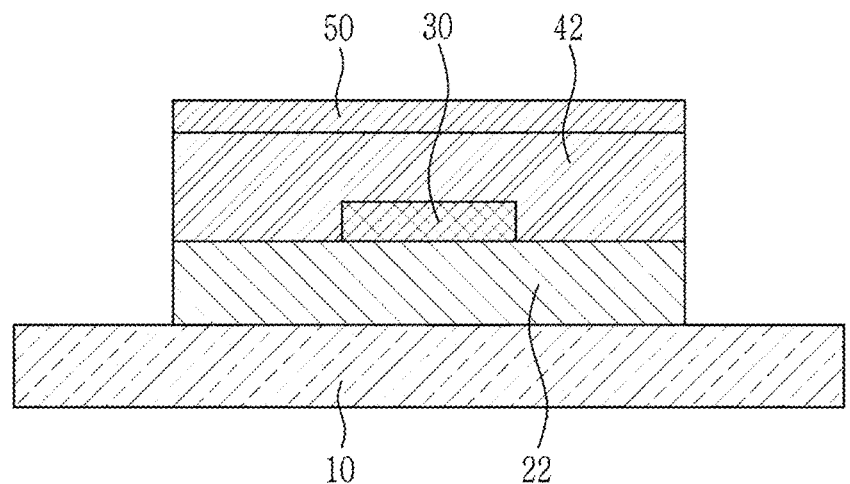

As shown in FIG. 2, in S60, the outer peripheries 201 and 401 positioned on the substrate 10 are removed by wet etching as shown in FIG. 8, that is, the outer periphery 201 of the light reflection portion 20 and the outer periphery 401 of the anti-reflection portion 40 are removed. On the other hand, the central parts of the light reflection portion 20 and the anti-reflection portion 40 in contact with the outer peripheries 201 and 401 are covered with the first photoresist layer 50 to protect them from wet etching. In wet etching, an aqueous hydrofluoric acid solution or the like can be used.

Figure 9:
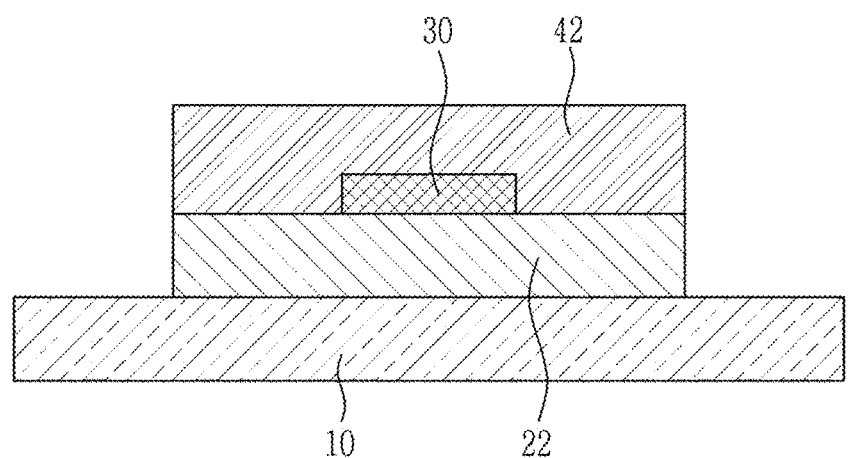
Figure 10:
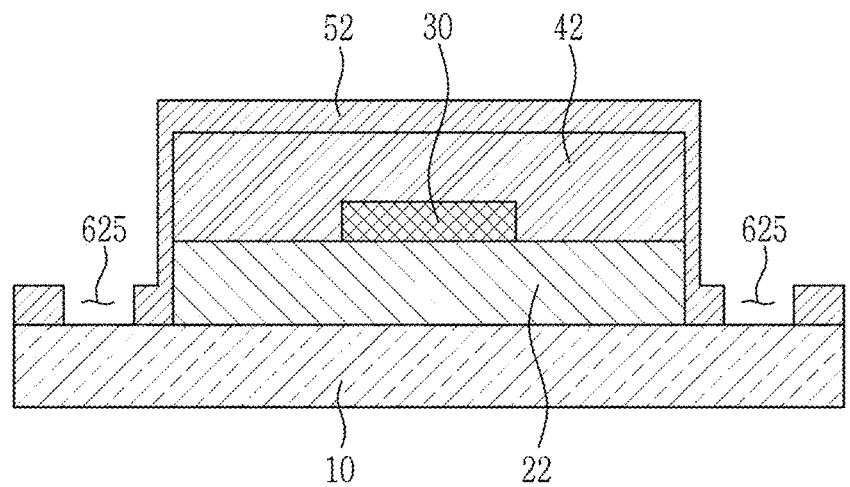

In S70 of FIG. 2, the first photoresist layer 50 is removed as shown in FIG. 9, and the first photoresist layer 50 is removed by cleaning or the like. Meanwhile, as a result of the wet etching in S60, the light reflection portion 22 and the anti-reflection portion 42 from which the outer peripheral portions 201 and 401 are removed, respectively, remain.

Next, in S80 of FIG. 2, the electron beam resistance layer 52 covering the remaining portions except for the light reflection portion 22 and the predetermined area 625 spaced apart from the surface of the substrate 10 is provided as shown in FIG. 9. Although not shown in FIG. 9, the electron beam resistance layer 52 may be formed only on a portion except for the predetermined region 625 using an electron microscope. As a result, the predetermined area 625 is exposed to the outside. The predetermined area 625 is formed in a portion corresponding to the outer peripheral portion 201 as shown in FIG. 7, but is spaced apart from the light reflection portion 22. In a subsequent process, a hard mask is formed in the predetermined region 625. In order to uniformly coat the electron beam resistance layer 52 and the second photoresist layer 54, it is preferable to separate the predetermined area 625 from the light reflection portion 22. On the other hand, the electron beam resistance layer 52 is thickly coated around it due to the thickness of the light reflection portion 22 and the anti-reflection portion 42.

Figure 11:
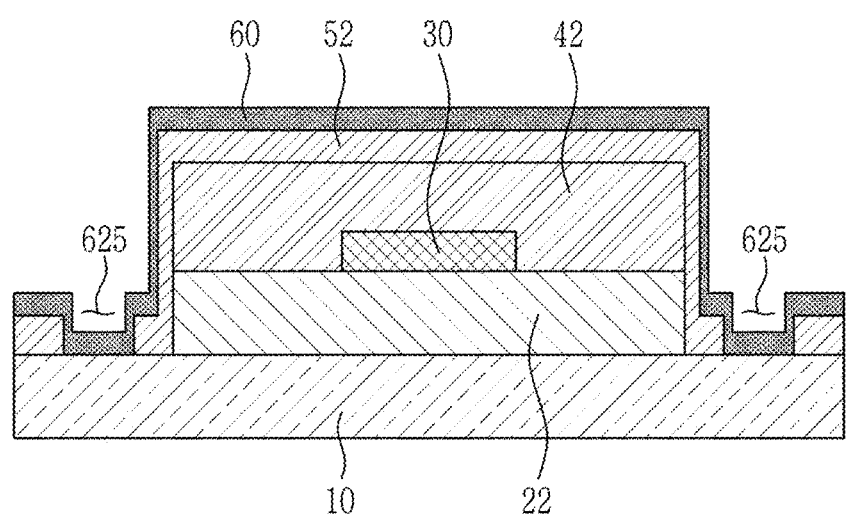

In S90 of FIG. 2, a mask layer 60 covering the predetermined region 625 and the electron beam resistance layer 52 is deposited. A mask layer 60 shown in FIG. 11 is deposited over both the electron beam resistance layer 52 and the predetermined region 625. As a result, the mask layer 60 directly contacts the substrate 10 in the predetermined region 625. The mask layer 60 is formed of a material having high etch resistance in SF6 plasma, such as chromium, aluminum, silicon oxide, or the like, to form a hard mask. The mask layer 60 is formed to a sufficient height so that a portion of the edge of the substrate 10 is not completely etched while the SF6 plasma is completely etched, so that the substrate is not exposed in the predetermined region 625.

Figure 12:
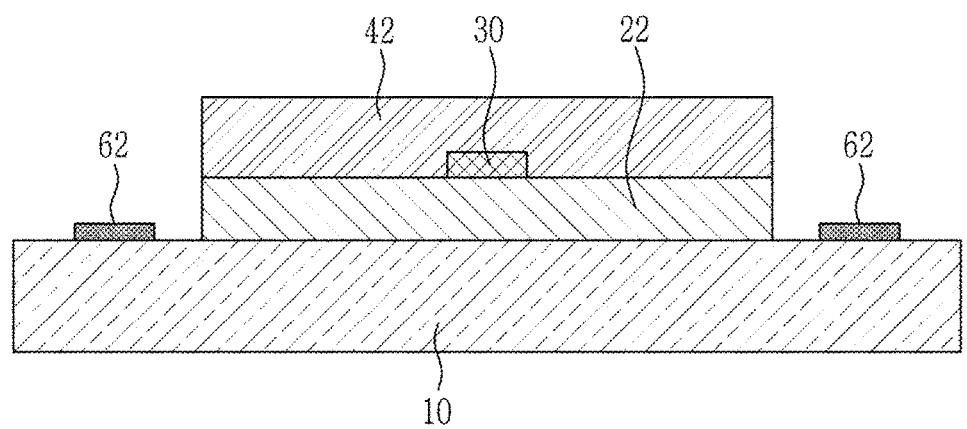

Next, in S100 of FIG. 2, the electron beam resistance layer 52 shown in FIG. 11 and the mask layer 60 shown in FIG. 11 formed thereon are removed to provide the remaining mask layer 62 as shown in FIG. 12. That is, since the electron beam resistance layer 52 is lifted off and cleaned, the mask layer 60 placed thereon is also removed. On the other hand, since the remaining mask layer 62 corresponding to the predetermined area 625 shown in FIG. 11 is not provided on the electron beam resistance layer 52 but directly contact with the substrate 10 without overlying, in S100 it is not removed by the process. Accordingly, the remaining mask layer 62 is provided directly on the substrate 10.

Figure 13:
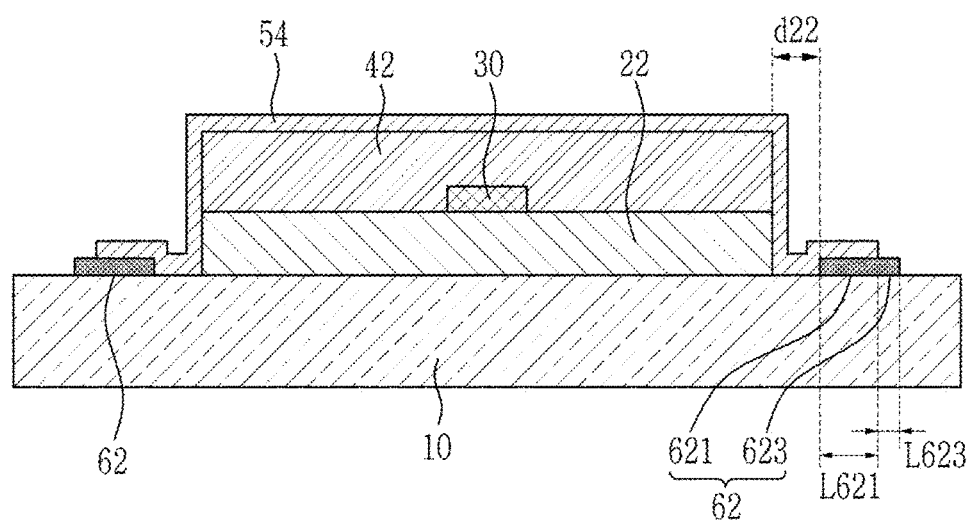
Figure 16:
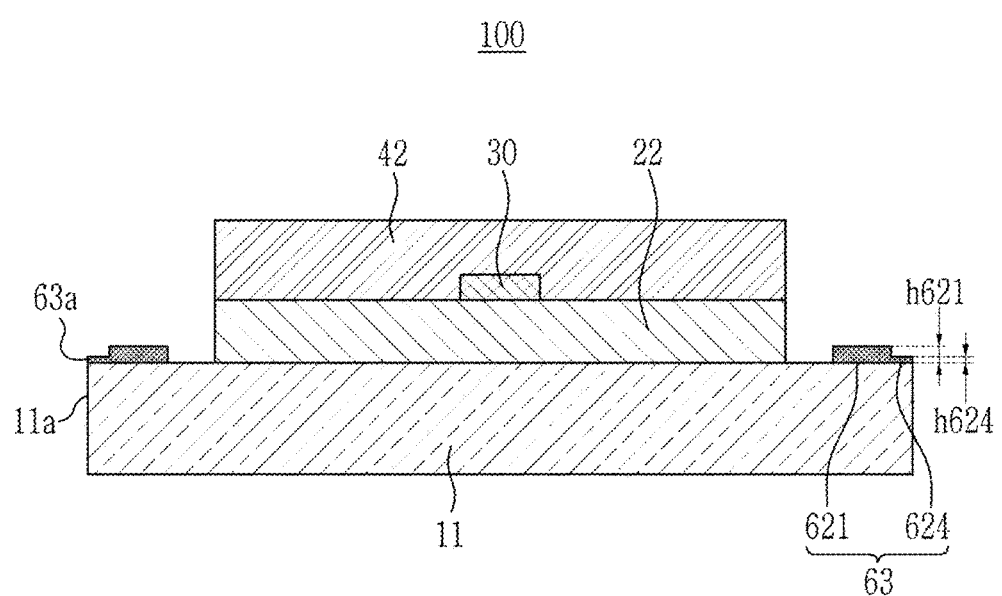
FIG. 16 is a schematic cross-sectional view of a light detecting device according to an embodiment of the present disclosure.

In S110 of FIG. 2, the second photoresist layer 54 partially covering the remaining mask layer 62 is formed, and the outer periphery 623 of the remaining mask layer 62 is exposed to the outside. The remaining mask layer 62 as shown in FIG. 13 aligns the second photoresist layer 54 which is patterned using a contact aligner. Accordingly, the occurrence of an error in the pattern size of the second photoresist layer 54 may be reduced. The remaining mask layer 62 includes an inner surface portion 621 and an outer peripheral portion 623. The inner surface portion 621 and the outer peripheral portion 623 are interconnected to the surface of the substrate 10 in the lateral direction thereof. The inner surface portion 621 is covered with the second photoresist layer 54, and the outer peripheral portion 623 is not covered with the second photoresist layer 54. Here, the width of the remaining mask layer 62, that is, the sum of the length L621 of the inner surface portion 621 and the length L623 of the outer peripheral portion 623 is proportional to the electron beam lithography time. Accordingly, when the length of the remaining mask layer 62 increases, the process cost may increase due to an increase in the use time of the electron microscope. The width of the hard mask 63 as shown in FIG. 16 in the finally manufactured light detection device 100 as shown in FIG. 1 is 10 μm to 20 μm. The length L621 of the inner surface portion 621 and the length L623 of the outer peripheral portion 623 are preferable to be at least 5 μm in consideration of an xy-axis alignment error that may occur during pattern formation of the second photoresist layer 54 and a critical dimension CD of the pattern.

Meanwhile, the separation distance d22 between the remaining mask layer 62 and the light reflection portion 22 may be 10 μm to 1000 μm. The thickness of the light reflection portion 22 using a dielectric mirror is several μm, and the thickness of the second photoresist layer 54 is at least 10 μm. Therefore, when the separation distance d22 is too small, due to the thickness of the side surfaces of the light reflection portion 22 and the anti-reflection portion 42 and the second photoresist layer 54, uniform coating and patterning of the second photoresist layer 54 may not be good. In addition, it is impossible for the separation distance d22 to be too large due to the design structure of the light detection device. Therefore, the separation distance d22 is maintained in the above-described range.

Figure 14:
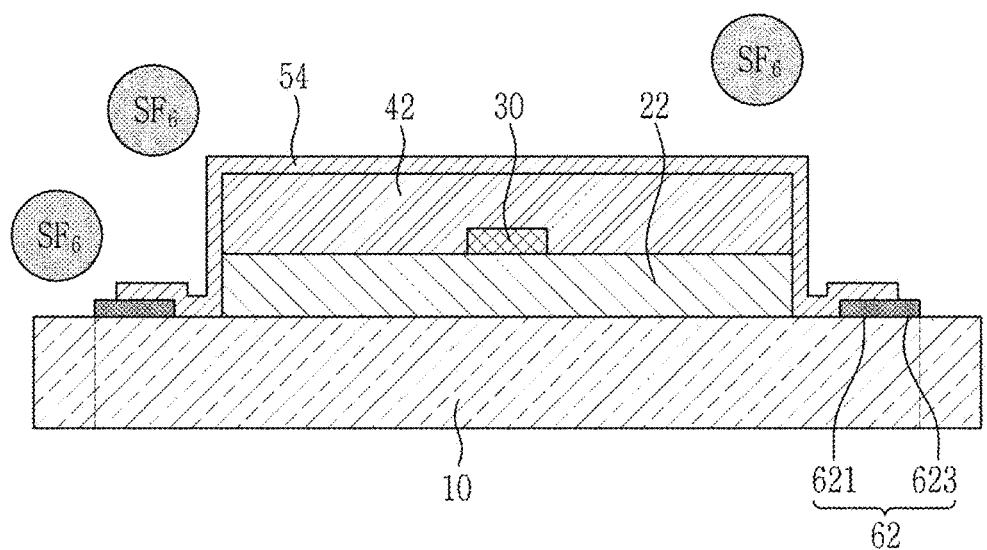

Next, in S120 of FIG. 2, the edge of the substrate 10 is removed. As shown in FIG. 14, that is, the edge of the substrate 10 not covered with the second photoresist layer 54 is removed by dry etching using SF6 gas as a reactive ion etching process. That is, the area outside the dotted line in FIG. 14 is removed. At the same time, the outer periphery 623 not covered with the second photoresist layer 54 is also partially etched to form the etched outer periphery 624, and the height thereof is lowered. That is, the hard mask 63 including the inner surface portion 621 and the etched outer peripheral portion 624 is manufactured.

Figure 15:
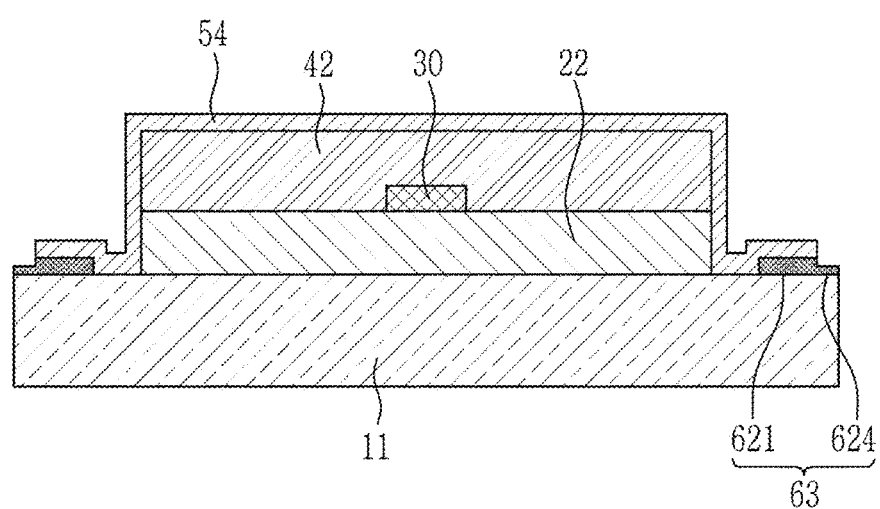

Finally, in S130 of FIG. 2, the second photoresist layer 54 is removed as shown in FIG. 15. The second photoresist layer 54 is removed through cleaning.

FIG. 16 is a schematic cross-sectional view of the light detection device 100 manufactured by the method of manufacturing the light detection device according to an embodiment of the present disclosure described above. The cross-sectional structure of the light detection device 100 of FIG. 16 is merely for illustrating the present disclosure, and the present disclosure is not limited thereto. Accordingly, the cross-sectional structure of the light detection device 100 may be modified into other shapes.

As shown in FIG. 16, the light detection device 100 is finally provided. The light-reflecting mirror 22 and the ring-shaped hard mask 63 are finally formed in the light detection device 100. The hard mask 63 includes an inner surface portion 621 and an etched outer peripheral portion 624. Here, a height h624 of the etched outer peripheral portion 624 based on the surface of the etched substrate 11 is smaller than a height h621 of the inner surface portion 621. Accordingly, the average height of the hard mask 63 is smaller than the height h624 of the etched outer peripheral portion 624. The height h621 of the inner surface portion 621 may be 100 nm to 200 nm, and the height h624 of the outer peripheral portion 624 may be 10 nm to 50 nm. Meanwhile, the sleeve 300 shown in FIG. 1 may be guided along the side surface 11a of the etched substrate 11.

The side surface 11a of the substrate 11 and the side surface 63a of the hard mask 63 are aligned with each other and are vertically connected continuously. That is, the vertical etching is well performed so that the side surface 11a of the substrate 11 and the side surface 63a of the hard mask 63 are continuously connected by the dry etching in S120. As a result, the sleeve 300 shown in FIG. 1 may be coupled to the outside of the side surface 11a of the substrate 11.

Figure 17:
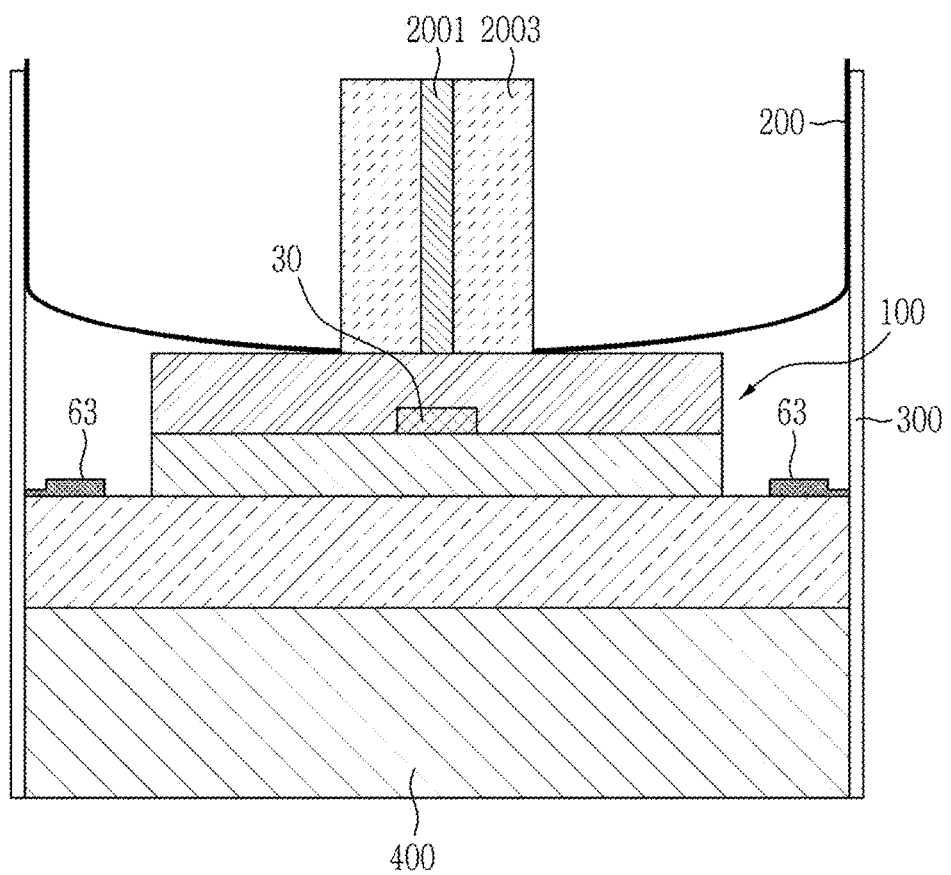
FIG. 17 is a schematic partial cross-sectional view showing a state of use of the light detection device taken along line XVII-XVII of FIG. 1.

FIG. 17 is a schematic partial cross-sectional view of the SNSPD taken along the line XVII-XVII of FIG. 1. The SNSPD of FIG. 17 is only for illustrating the present disclosure, and the present disclosure is not limited thereto. Therefore, the SNSPD can be modified into other forms.

As shown in FIG. 17, the optical ferrule 200 is guided inside the sleeve 300 to be contact with the optical detection element 100. The optical ferrule 200 includes an optical fiber 2001 formed in the center thereof, and the optical fiber 2001 is surrounded by the optical fiber cladding 2003. Since the light detection device 100 is guided by the side 11a of the substrate 11 having a thickness of several hundred μm and is drawn into the sleeve 300, the light detection device 30 is located exactly in the center in the sleeve 300. As a result, the optical fiber 2001 is precisely aligned with the light detection device 30 to detect light well. That is, the optical fibers 2001 are aligned to match the detection area formed by the light detection device 30. When the optical fiber 2001 of several tens of μm and the light detection device 30 are assembled, they are aligned in a line with each other to improve the loss rate due to assembling.

Hereinafter, the present disclosure will be described in more detail through experimental examples. These experimental examples are merely for illustrating the present disclosure, and the present disclosure is not limited thereto.

Experimental Example

A light detection device according to an embodiment of the present disclosure and a light detection device according to the prior art were manufactured. They were compared with each other as below.

Figure 18:
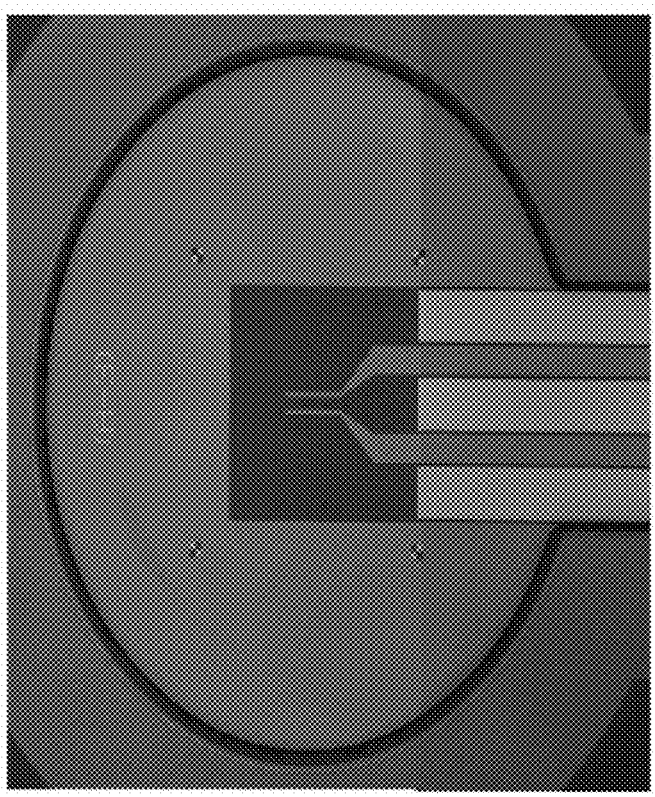
FIGS. 18 to 20 are plan photographs of a light detection device manufactured according to an experimental example of the present disclosure.
Figure 19:
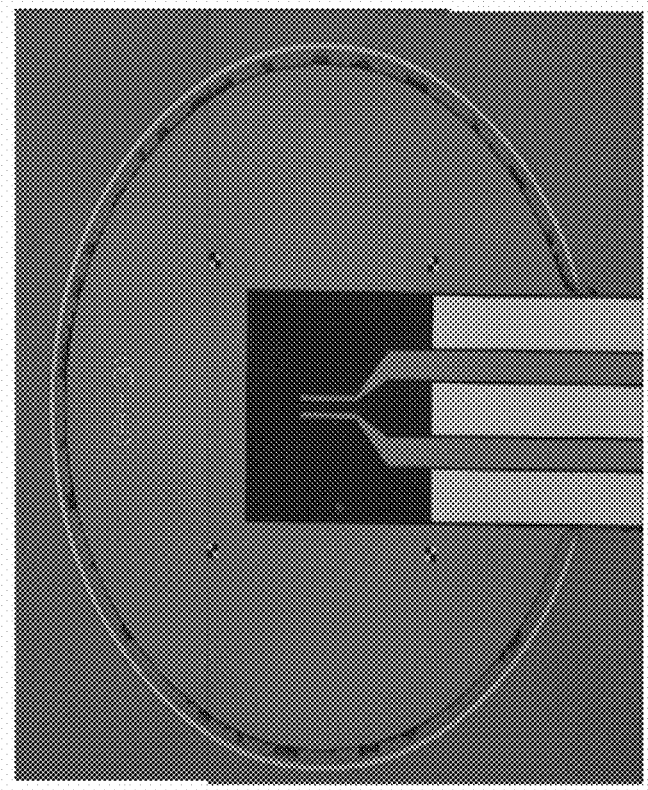
Figure 20:
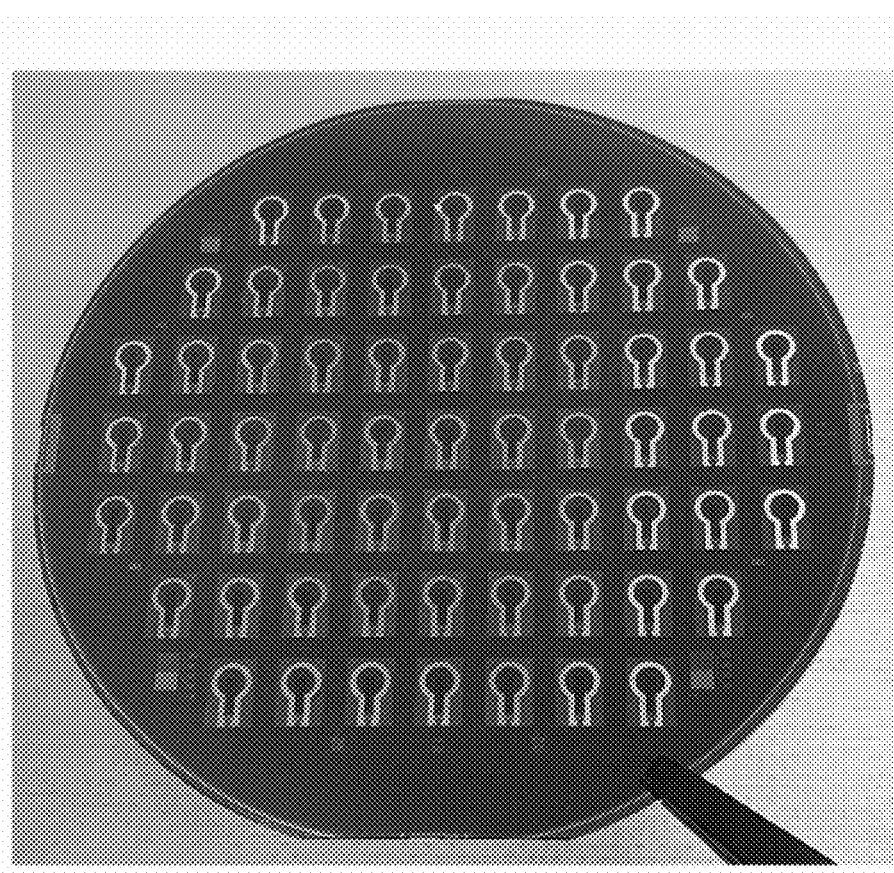

FIGS. 18 to 20 respectively show planar photos of the light detection devices manufactured according to the experimental examples of the present disclosure. More specifically, FIG. 18 is a photo patterned and applied with a second photoresist before a deep reactive ion etching RIE process, FIG. 19 is a photo of a hard mask formed around the light detection device, and FIG. 20 shows a photograph in which a plurality of lollipop-shaped light detection devices are formed on a silicon wafer substrate.

The diameter of the circular part of the light detection device element manufactured in this way was 2.5 mm. In addition, the diameter of the light detection device 30 for the SNSPD was 15 μm.

Alignment Experiment

Figure 21A:
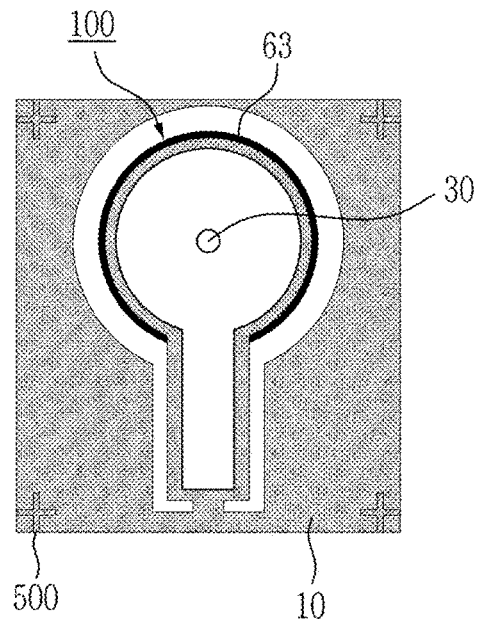
FIGS. 21A and 21B are schematic views comparing a light detection device according to an embodiment of the present disclosure and a light detection device according to a comparative example of the related art.
Figure 21B:
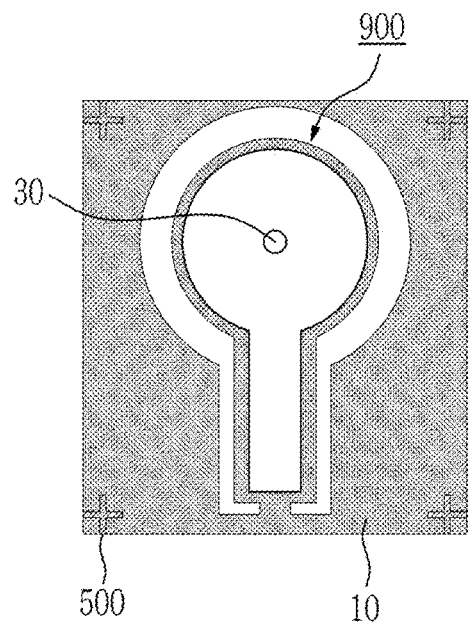

FIGS. 21A and 21B schematically shows a comparison between the light detection device 100 according to an embodiment of the present disclosure and the light detection device 900 according to a comparative example of the prior art. More specifically, FIG. 21A shows the light detection device 100 having the hard mask 63 formed thereon, and FIG. 21B shows the light detection device 900 in which the hard mask 63 is not formed.

As shown in FIG. 21A, in the experimental example of the present disclosure, a light detection device 100 was manufactured on a substrate 10 through a semiconductor manufacturing process. On the other hand, the optical fiber diameter of the optical ferrule, which is the target of the optical detection element 100, was 9 μm. In the experimental example, the light detection device 100 was aligned with a contact aligner using the alignment key 500. In this case, the number of position errors was several μm, and the critical dimension error of the diameter of the circular portion of the light detection device 100 was also several μm. That is, as a result of forming the inner surface portion 621, it was possible to accurately align the error so as to be negligible. As a result, the error between the optical fiber and the light detection portion 30 was only several tens of nm. In particular, even when the light detection device 30 is not located in the center, the error is only tens of nm, and even when the diameter of the circular part of the light detection device 100 is not 2.5 mm due to tolerance, the error is in the tens of nm only.

On the other hand, as shown in FIG. 21B, in the comparative example, the light detection device element was aligned with the contact aligner using the alignment key 500. In this case, the number of position errors was several μm, and the critical dimension error of the diameter of the circular portion of the light detection device was also several μm. As a result of assembling the optical ferrule and the light detection device, the error between the optical fiber and the light detection device was as large as several μm. In particular, when the light detection device 30 is not located in the center, the error was several μm, and even when the diameter of the circular part of the light detection device 100 is not 2.5 mm due to tolerance, the error was very large, as many as several μm. Accordingly, the alignment accuracy between the optical fiber and the light detection portion 30 can be greatly improved by the formation of the hard mask 63. In addition, path misalignment due to the inaccuracy of the critical dimension of the photoresist layer and the limitation of the contact aligner could be improved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of manufacturing a light detection device comprising:
   providing a substrate;
   providing a light reflecting portion on the substrate;
   providing a light detection portion directly on the light reflection portion;
   providing an anti-reflection portion provided on the light reflection portion to cover the light detection portion;
   removing each of a first outer periphery of the light reflection portion and a second outer periphery of the anti-reflection portion, and
   providing a hard mask formed to correspond to the removed first outer periphery, positioned on the substrate, and spaced apart from the light reflecting portion to surround the light reflecting portion; the hard mask being a continuous layer;
   wherein the providing the hard mask comprises:
       providing an electron beam resistance layer covering a portion except for a predetermined region formed to be spaced apart from an edge of the light reflection portion and a surface of the substrate and exposing a substrate corresponding to the predetermined region;
       depositing a mask layer covering the predetermined region and the electron beam resistance layer; the mask layer being in direct contact with the electron beam resistance layer and with the substrate in the predetermined region;

removing the electron beam resistance layer and the mask layer formed on the electron beam resistance layer to provide a remaining mask layer in the predetermined region;

forming a photoresist layer partially covering the remaining mask layer while aligning with the remaining mask layer and exposing a third outer periphery of the remaining mask layer to the outside;

removing a portion of the substrate exposed to the outside of the third outer periphery; and removing the photoresist layer to provide the hard mask;

wherein an upper portion of the third outer periphery is etched and then a height of the third outer periphery is smaller than an average height of the remaining mask layer in the removing a portion of the substrate exposed to the outside of the third outer periphery.

2. The method of claim 1, wherein in the providing the substrate, the substrate comprises
a circular part and
a holder part connected to one side of the circular part and is longitudinally extended.

3. The method of claim 2, wherein the hard mask is provided on an outer periphery of the circular part in the providing the hard mask.

4. The method of claim 1, wherein the removing each of the first outer periphery of the light reflection portion and the second outer periphery of the anti-reflection portion comprises:

forming a photoresist layer on the anti-reflection portion;

removing each of the first outer periphery and the second outer periphery by wet etching, and removing the photoresist layer.

5. The method of claim 4, wherein a shared area of the anti-reflection portion and the photoresist layer is surrounded by a non-shared area of the anti-reflection portion and the photoresist layer, and the first outer periphery and the second outer periphery are positioned in the non-shared area.

* * * * *